United States Patent [19]

Takahashi et al.

[11] 4,315,698
[45] Feb. 16, 1982

[54] COUPLING SLEEVE

[75] Inventors: Kotei Takahashi, Tokyo; Teruo Endo, Fujisawa; Masayuki Kawaguchi, Tokyo; Kenichi Sakamoto, Fujisawa, all of Japan

[73] Assignee: Nissan Motor Company, Limited, Yokohama, Japan

[21] Appl. No.: 84,145

[22] Filed: Oct. 12, 1979

[30] Foreign Application Priority Data

Nov. 8, 1978 [JP] Japan .................................. 53-138151

[51] Int. Cl.³ .......................... F16B 7/06; F16C 11/00; F16G 11/12; F16B 7/10
[52] U.S. Cl. .................................... 403/59; 74/473 R; 192/82 R; 308/DIG. 7; 308/DIG. 9
[58] Field of Search ............................. 403/1, 59, 375; 74/473 R; 192/82 R; 308/DIG. 7, DIG. 8

[56] References Cited

U.S. PATENT DOCUMENTS

| 2,329,354 | 9/1943 | McCarter | 74/473 X |
|---|---|---|---|
| 2,552,765 | 5/1951 | Bixby et al. | 74/473 |
| 2,675,276 | 4/1954 | Daugherty | 308/DIG. 8 |
| 2,675,283 | 4/1954 | Thomson | 308/DIG. 7 |
| 2,892,358 | 6/1959 | Backus et al. | 74/473 |
| 2,944,831 | 7/1960 | Thomas | 308/DIG. 8 |
| 3,915,027 | 10/1975 | Simmons et al. | 192/82 R X |
| 4,135,773 | 1/1979 | Van Remoortel | 308/DIG. 8 |
| 4,208,472 | 6/1980 | Cho et al. | 308/DIG. 8 |

FOREIGN PATENT DOCUMENTS

| 667966 | 8/1963 | Canada | 308/DIG. 7 |
|---|---|---|---|
| 1260046 | 3/1961 | France | 308/DIG. 7 |

Primary Examiner—Wayne L. Shedd

[57] ABSTRACT

A rotatable coupling sleeve is disclosed which is movable axially along its support with movement of a shifter fork engaged with the coupling sleeve. The coupling sleeve has its portion contacting with the shifter fork and covered wear-resistive material having high self-lubricating antiwear properties.

8 Claims, 7 Drawing Figures

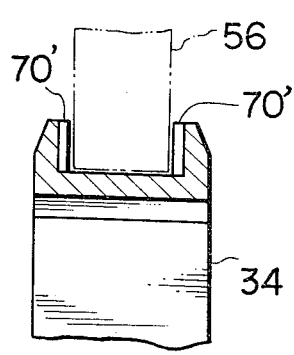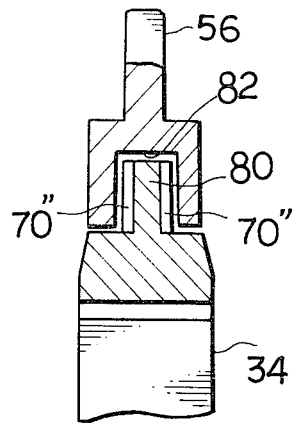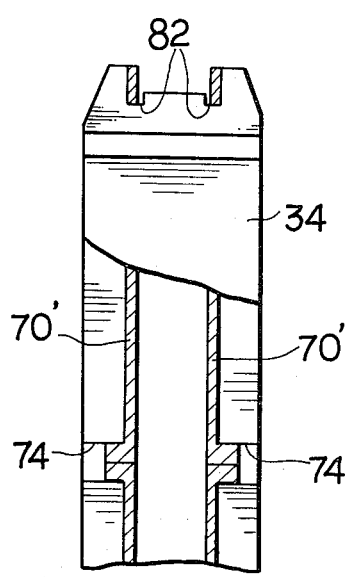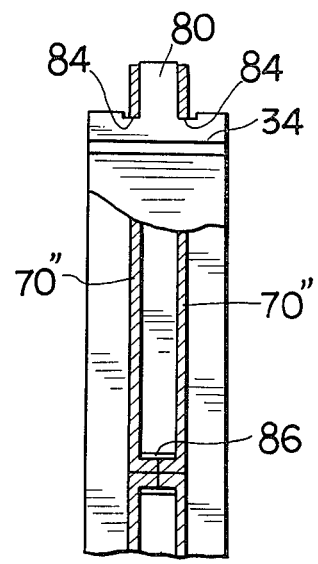

COUPLING SLEEVE

BACKGROUND OF THE INVENTION

1. Field of the Invention

This invention relates to a coupling sleeve for use in an automotive vehicle power transmission.

2. Description of the Prior Art

In normal automotive vehicle power transmissions, when a driver operates a shift lever to effect a speed ratio change, the displacement of the shift lever is transmitted through a link mechanism to a shift fork engaging a coupling sleeve rotating with a drive shaft, thereby axially moving the coupling sleeve into engagement with a gear rotating freely on the drive shaft so as to lock the gear to the drive shaft. Since speed ratio changes are frequently effected during vehicle operation, the shift fork and coupling sleeve are subject to great wear at their contacting portions. This causes a reduction of displacement of the coupling sleeve, resulting in failure to effect certain and smooth speed ratio changes. In order to eliminate such difficulties, attempts have been made to harden the surface of the shift fork and to cover the contacting portion of the shift fork with the coupling sleeve with metal having a high antiwear property. However, these attempts cannot prevent the wear of the coupling sleeve although they can prevent the wear of the shift fork. Furthermore, since the contacting portion of the shift fork is smaller than the contacting portion of the coupling sleeve, the antiwear material becomes worn in a relatively short time.

SUMMARY OF THE INVENTION

It is therefore one object of the present invention to increase the life and reduce the wear of the coupling sleeve and the shift fork.

Another object of the present invention is to provide an improved coupling sleeve which permits smooth and certain speed ratio changing operations for a long time.

According to the present invention, these and other objects are accomplished by a coupling sleeve movable axially along its support with movement of a shift fork engaged with the coupling sleeve, characterized in that the coupling sleeve has its portion contacting the shift fork covered with wear-resistive material having high self-lubricating and antiwear properties.

Other objects, means, and advantages of the present invention will become apparent to one skilled in the art thereof from the following description.

BRIEF DESCRIPTION OF THE DRAWINGS

The following explanation of several preferred embodiments of the present invention will help in the understanding thereof, when taken in conjunction with the accompanying drawings, which, however, should not be taken as limiting the present invention in any way, but which are given for purposes of illustration only. In the drawings, like parts are designated by like reference numerals in the several figures, and:

FIGS. 4 to 7 are fragmentary sectional views illustrating other embodiments of the present invention.

DESCRIPTION OF THE PREFERRED EMBODIMENTS

Figure 1:
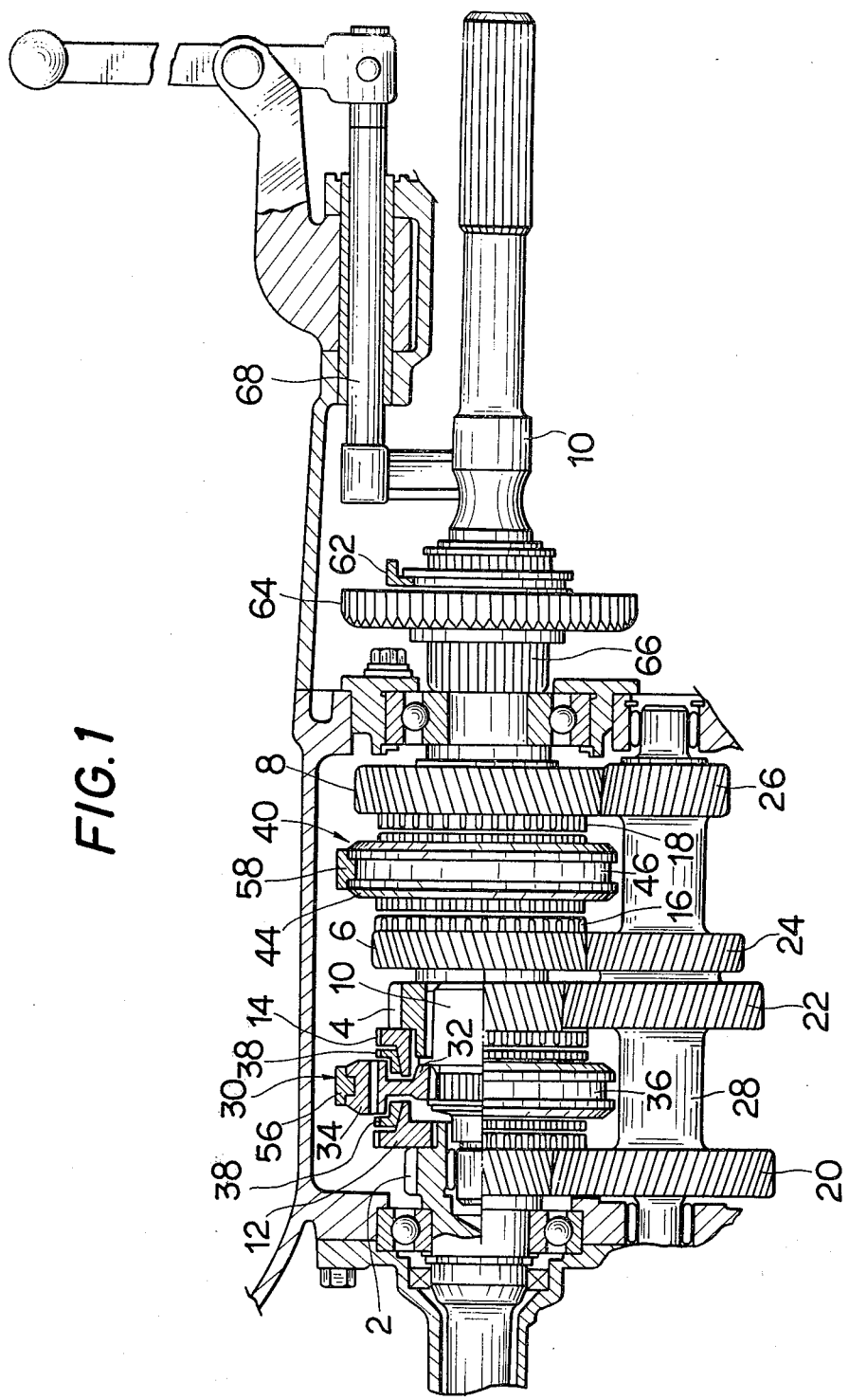
FIG. 1 is a longitudinal sectional view illustrating a power transmission including coupling sleeves made in accordance with the present invention.

Referring to FIG. 1, there is illustrated an automotive vehicle power transmission including coupling sleeves made in accordance with the present invention. The power transmission comprises a main drive gear 2 rotatable with rotation of the engine (not shown), a third gear 4, a second gear 6, and a first gear 8, all of which are mounted on a main shaft 10 for free rotation. The main drive gear 2 and the third gear 4 are provided on their facing surfaces with clutch gears 12 and 14, respectively, and the second and first gears 6 and 8 are provided on their facing surfaces with clutch gears 16 and 18, respectively. The power transmission also comprises a gear 20 in mesh with the main drive gear 2, a third-speed gear 22 in mesh with the third gear 4, a second-speed gear 24 in mesh with the second gear 6, and a first-speed gear 26 in mesh with the first gear 8. All of the gears 20 to 26 are fixedly secured on a counter gear shaft 28.

Fixedly secured on the main shaft 10 between the main drive gear 2 and the third gear 4 is a first synchromesh mechanism 30 which comprises a synchrohub 32 rigidly fixed on the main shaft 10, a coupling sleeve 34 splined to the outer periphery of the synchrohub 32 and formed in its peripheral surface with a fork groove 36, and two fork rings 38. The coupling sleeve 34 comes into mesh with the clutch gear 12 of the main drive gear 2 for transmitting rotation of the main drive gear 2 to the main shaft 10 when axially moved to the left. If the coupling sleeve 34 is axially moved to the right, it comes into mesh with the clutch gear 14 of the third gear 4 for transmitting rotation of the third gear 4 to the main shaft 10. A second synchromesh mechanism 40, which is similar in structure to the first synchromesh mechanism 30, is also fixedly secured on the main shaft 10. The coupling sleeve 44 of the second synchromesh mechanism 40 comes into mesh with the clutch gear 16 of the second gear 6 for transmitting rotation of the second gear 6 to the main shaft 10 when axially moved to the left and comes into mesh with the clutch gear 18 of the first gear 8 for transmitting rotation of the first gear 8 to the main shaft 10 when axially moved to the right.

Figure 2:
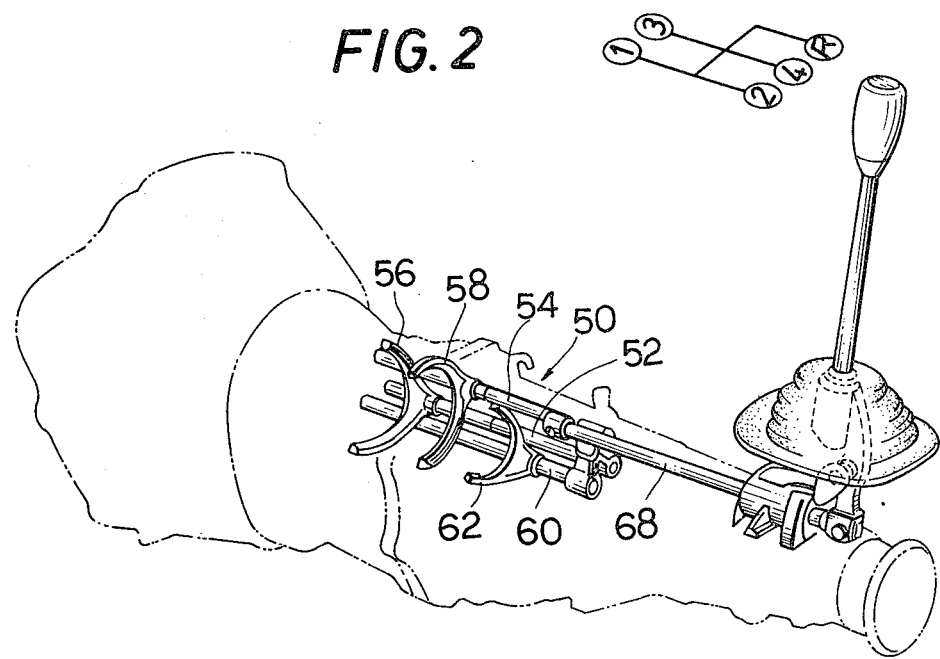
FIG. 2 is a perspective view of an operating mechanism for operating synchromesh mechanisms equipped with the coupling sleeve of the present invention.

Referring to FIG. 2, there is illustrated an operating mechanism for operating the first and second synchromesh mechanisms 30 and 40. The operating mechanism 50 comprises fork rods 52 and 54 extending in parallel with the main shaft 10, shift forks 56 and 58 having their base portions secured to the respective fork rods 52 and 54 and their semi-circular forked portion engaged with the fork grooves 36 and 46 of the respective coupling sleeves 34 and 44 so that the shift forks 56 and 58 can be moved together with the respective coupling sleeves 34 and 44 with movement of the respective fork rods 52 and 54. Another fork rod 60 is provided which has a fork 62 secured thereto for sliding a reverse gear 64 on the main shaft 10 through a bush 66. The fork rods 52, 54 and 60 are selectively slid on the main shaft 10 by a striking rod 68.

Figure 3:
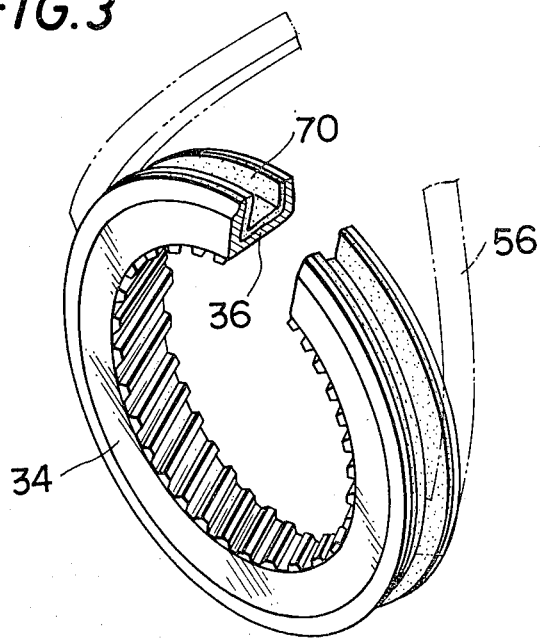
FIG. 3 is a perspective view illustrating one embodiment of the present invention.

Referring to FIG. 3, there is illustrated in greater detail the coupling sleeve 34 which is substantially similar in structure to the coupling sleeve 44. A wear-resistive member 70 having high self-lubricating and antiwear properties and U-shaped cross section is rigidly fitted in the fork groove 36 of the coupling sleeve 34. The wear-resistive member 70 may preferably comprise synthetic resin high in antiwear and self-lubricating properties. Such materials include, but are in no way limited to, polyamide resin available from DuPont under the Tradename Nylon, ethylene tetrafluoride available from DuPont under the Tradename Teflon, and acetal resin available from DuPont under the Tradename Delrin. Furthermore, the wear-resistive member 70 may comprise metal having high antiwear and self-lubricating properties such as sintered oleometal. If the wear-resistive member 70 is formed of synthetic resin, it may be fixed in place by coating, sticking, or fitting projections formed on the wear-resistive member 70 in recesses formed in the coupling sleeve 34. If the wear-resistive member 70 is formed of metal, it may be fixed in place by fusing or sticking.

The coupling sleeve structure of the present invention is effective to protect the coupling sleeve from wear and assures smooth and certain speed ratio changing operation for a long time. Furthermore, since the wear-resistive member 70 is formed of synthetic resin or soft metal, the coupling sleeve structure of the present invention can reduce the wear of the associated shift fork particularly where the shift fork is formed of material having relatively poor wear resistance for purpose of weight reduction.

FIG. 4 illustrates a second embodiment of the present invention in which wear-resistive members 70' are secured to the side wall surface of the fork groove 36 in the same manner as described in connection with FIG. 3. The coupling sleeve structure of this embodiment provides the same effect as described in conjunction with the first described embodiment since most of the force of the shift fork exerted on the coupling sleeve 34 is centered on the side wall surfaces of the fork groove 36 and almost no force is exerted on the bottom surface of the fork groove 36. FIG. 5 shows another embodiment in which the fork groove 36 is formed on opposite sides of its bottom surface with small grooves 82 each receiving the wear-resistive member 70' and formed in each of its side wall surfaces with a recess 74 receiving the turned portions of the wear-resistive member 70'.

FIG. 6 illustrates a third embodiment of the present invention in which the coupling sleeve 34 is formed on its peripheral surface with an annular projection 80 fitted in groove 82 formed in the shift fork 56. Wear-resistive members 70" are secured to the opposite side surfaces of the annular projection 80. The wear-resistive members 70" may be secured to the projection 80 in the same manner as described in connection with the first embodiment. It is to be noted, of course, that the annular projection 80 of the coupling sleeve 34 may be covered with an annular wear-resistive member of U-shaped cross section. The coupling sleeve structure of this embodiment provides the same effect as described in connection with the first embodiment. FIG. 7 shows another attachment in which the peripheral surface of the coupling sleeve 34 is formed on opposite sides of the projection 80 with slits 84 each receiving a wear-resistive member 70" and the projection 80 is formed on each of its opposite side surface with a recess 86 receiving the turned end portions of the wear-resistive member 70".

It is therefore apparent from the foregoing that there has been provided, in accordance with the present invention, a coupling sleeve structure capable of increasing the life and reducing the wear of the coupling sleeve and the associated shift fork, thereby permitting smooth and certain speed ratio changing operations for a long time that fully satisfies the objects, aims and advantages set forth above. While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A rotatable coupling sleeve movable axially along a support with movement of a shifter fork engaged over a relatively small surface area thereof with said coupling sleeve, said coupling sleeve having substantially its entire portion contacting said shifter fork covered with wear-resistive material having high self-lubricating and antiwear properties.

2. A coupling sleeve according to claim 1, wherein said coupling sleeve is formed in its peripheral surface with a fork groove for receiving therein said shifter fork and a U-shaped member made of said wear-resistive material is attached in said fork groove.

3. A coupling sleeve according to claim 1, wherein said coupling sleeve is formed in its peripheral surface with a fork groove for receiving therein said shifter fork and said fork groove has its side wall surfaces covered with said wear-resistive material.

4. A coupling sleeve according to claim 3, wherein said fork groove is formed on opposite sides of its bottom surface with grooves each receiving a member made of said wear-resistive material and formed in each of its side wall surfaces with a recess receiving turned end portions of said member.

5. A coupling sleeve according to claim 1, wherein said coupling sleeve is formed on its peripheral surface with an annular projection fitted in a groove formed in said shift fork, and said annular projection has opposite side surface covered with said wear-resistive material.

6. A coupling sleeve according to claim 5, wherein said peripheral surface of said coupling sleeve is formed on opposite sides of said projection with grooves each receiving a member made of said wear-resistive material, and said projection being formed in each of its opposite side surfaces with a recess receiving turned end portions of said member.

7. A coupling sleeve according to claim 1, wherein said wear-resistive material is synthetic resin including polyamide resin, ethylene tetrafluoride, and acetal resin.

8. A coupling sleeve according to claim 1, wherein said wear-resistive material is sintered oleo-metal.

* * * * *